Jan. 3, 1956  D. W. JONES  2,729,226
AUTOMATIC SOURCE SELECTOR VALVE
Filed June 24, 1952
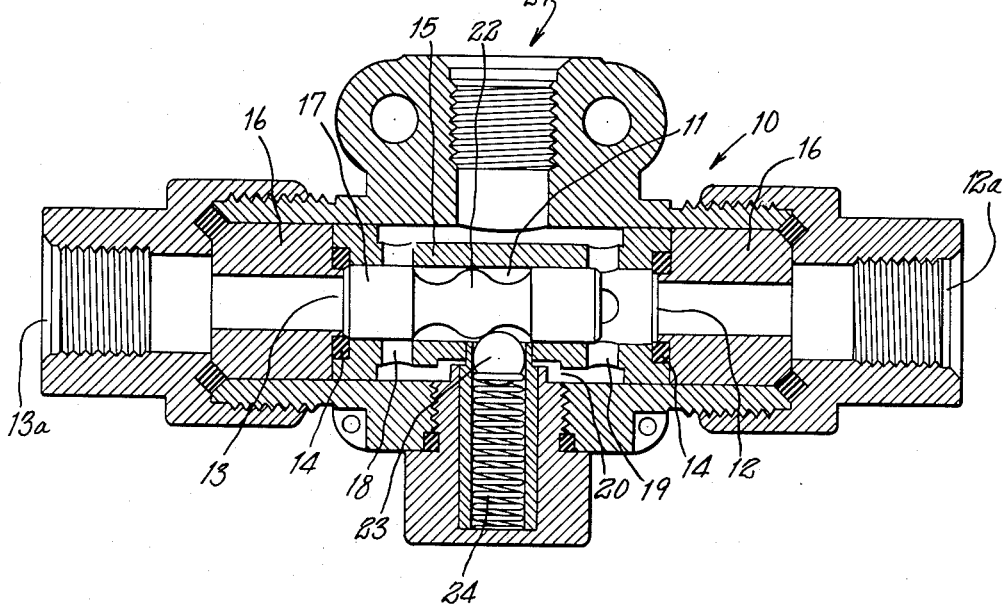
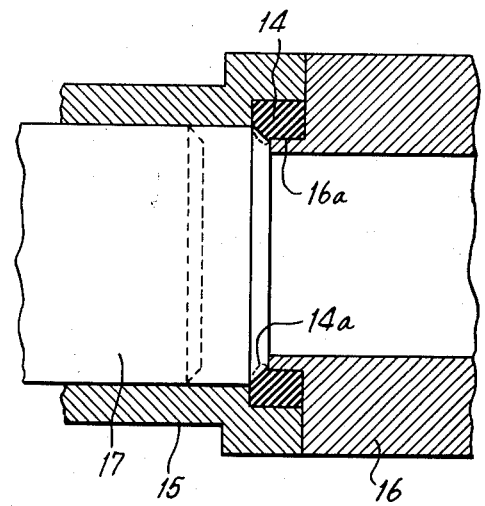
INVENTOR.
DAVID W. JONES
BY
ATTORNEYS United States Patent Office 2,729,226
Patented Jan. 3, 1956

2,729,226

AUTOMATIC SOURCE SELECTOR VALVE

David W. Jones, Commack, N. Y., assignor to Kenyon Instrument Company, Inc., Huntington, N. Y.

Application June 24, 1952, Serial No. 295,161

7 Claims. (Cl. 137—112)

There are several needs in modern aircraft, as in other devices employing hydraulic or pneumatic actuation of components, for an automatic selection of the source of hydraulic or pneumatic power. For example, in modern aircraft the landing gear, including both main wheels and struts and the nose gear, is lifted by actuating pistons and is also extended and locked in place by those same pistons operated in cylinders. Hydraulic fluid usually is the vehicle for the energy and is valved into the cylinder actuating the piston in either direction, by a hand-operated (or servo-operated) selector valve. Particularly in combat aircraft where the hazard of damage from enemy fire is great, as well as in civilian aircraft where the utmost of assurance must surround the landing gear actuation, it is essential to provide a separate source of energy in the event of damage to any portion of the power system other than the actual piston and cylinder actuator itself. For this reason, many aircraft employ a pneumatic standby system with a short run of tubing from a reservoir directly to the actuating cylinder, by-passing all of the normal hydraulic system including its hand or servo-operated selector valve.

In order to make such standby or emergency system properly operable, it is necessary to contemplate either a completely open (shot away) hydraulic line to the actuating cylinder, or a completely blocked line such as would occur with an inoperative selector valve. Accordingly, it is customary to provide an automatic source selector valve located either directly on the operating cylinder or as closely adjacent to it as is physically practical. Such a valve must permit the entrance of pneumatic fluid whenever a small differential pressure is exerted by the pneumatic fluid, slightly greater than that existing in the hydraulic system. Also, such a valve must be capable of shutting off the normal hydraulic line whenever pressure from the pneumatic system is provided, and must do this with little or no leakage into the hydraulic system during the shutting off process. It must also be capable of resetting itself in the normal position as soon as the emeregency system is turned off and the normal hydraulic pressure restored. Moreover, such a valve must be capable of operating after many months of inactivity in one posiiton and do so with the utmost reliability.

There is another common application of such source selector valves, namely, in brake systems. In brake systems where two pilots must be available for operating an aircraft, it is common practice to provide brake pedals for each pilot. In many modern aircraft, brakes are operated by the pressure in the aircraft's hydraulic system. In the usual arrangement, means are provided by which the movement of the brake pedal or the pressure applied to it govern the degree of the available hydraulic pressure applied to the brakes. In the event one pilot exerts pedal pressure sufficient to give 1000 lbs. per square inch at the wheels and the other pilot wishes to apply more brake pressure and exerts sufficient pedal pressure normally to provide 1500 lbs. per square inch at the wheels, means must be provided to prevent the 1500 lbs. of operating pressure reacting back to the servo-system of the other set of pedals. Here again an automatic source selector valve is used which serves simply to choose the pilot who is exerting the most foot pressure as the one who will operate the brakes. The source selector valve in this case again prevents flow in the opposite direction as described above. In this brake application the shuttle valve, as it is frequently called, will shuttle back and forth a great many times during any one brake application by both pilots. In this case, of course, the valve must have long life or ability to stand up under many thousands of cycles of operation.

The present invention has for its principal object the provision of an improved automatic source selector valve which meets the above-mentioned requirements more completely and effectively than has been possible heretofore and yet is of simple and compact construction.

A selector valve made according to the present invention comprises a housing forming a piston chamber having opposed ports at its ends. These ports are adapted for connection to separate fluid pressure sources, such as a hydraulic source of relatively high pressure and a pneumatic source of relatively low pressure for normal and emergency operation, respectively, of a device to be actuated. A double-ended piston is reciprocable in the chamber to engage alternately with seats defining these ports and thereby close the ports alternately in the reciprocation of the piston. Passages lead laterally from the piston chamber to the device to be actuated, which may be a main actuating cylinder for operating a landing gear, brakes, etc. These passages are spaced longitudinally of the piston, and each passage is spaced from the remote seat a distance greater than the distance between the seat engaging parts of the piston. In this way, engagement of the piston with either seat allows communication between the other seat and the passage nearer thereto, via the piston chamber. Interengaging cam and biasing elements are located one on the piston and the other in the housing, and these elements are operable to shift the piston from an intermediate position to either of the seats, depending upon which of the pressures in the end ports is greater, that is, predominates. Preferably, the cam element is located on the piston intermediate its ends, and the biasing element is a spring-pressed part movable in the housing and engaging the cam.

In the preferred construction, the valve housing has an outlet port leading to the device to be actuated and forms an annular space surrounding the piston chamber and through which the lateral passages communicate with the outlet port; and the spacing between the remote edges of the passages is less than the distance between the seat-engaging parts of the piston. In this way, neither passage leading to the device to be actuated is uncovered even partly by the piston until the other passage has been completely covered by the piston. This greatly reduces the possibility of leakage from one pressure fluid source to the other in shifting of the piston from one seat to the other. Also, I prefer to make the piston seats of rubber-like rings each held by a pair of annular clamping members which extrude or bulge the ring inwardly into the path of the piston, one of the clamping members for each ring forming a metallic seat for the piston. In this way, the piston forms a tight seal with the bulging part of each rubber-like ring, and the life of the seating rings is extended.

For a better understanding of the invention, reference may be had to the accompanying drawing, in which:

Fig. 1 is a longitudinal sectional view of a preferred form of the new automatic selector valve, and Fig. 2 is a similar view, enlarged, showing a detail of part of the valve.

In Fig. 1, the valve housing is indicated generally at 10. It forms an elongated cylindrical piston chamber 11 having opposed inlet ports 12 and 13 at its ends. These ports are adapted to be connected to separate sources of fluid pressure, such as a hydraulic source of relatively high pressure via coupling 12a and an emergency pneumatic source of relatively low pressure via coupling 13a, respectively.

The ports 12 and 13 are each defined by a ring 14 made of rubber, or the like. Each ring 14 is held between two annular clamping members 15 and 16 of the housing (Fig. 2), these members being urged together to extrude or bulge the ring inwardly into the path of a double-ended piston 17 reciprocable in the chamber 11. Thus, the rings 14 form seats for the piston at the ends of chamber 11; and each seat is bulged by the clamping members 15—16, as shown in dotted lines at 14a in Fig. 2, except when the adjacent piston end is pressed against the seat, as shown in full lines in Fig. 2. The axially extending lip 16a of each clamping member 16 serves not only to provide part of the captive wall confining and extruding the ring 14 but also to form a positive stop for piston 17 so that it cannot compress the protruding portion of ring 14 enough to damage it. The clamping members 16 at the ends of the piston chamber may coact with a common clamping member 15 forming this chamber, and the clamping members may be urged together by the coupling members 12a and 13a threaded on the housing at the outer ends of clamping members 16.

The annular member 15 has ports or passages 18 and 19 extending laterally from the piston chamber 11 and leading into an annular space 20 surrounding this chamber. The passages 18 and 19 are spaced longitudinally of the piston, and each passage is spaced from the more remote seat 14 a distance greater than that between the seat-engaging ends of the piston. However, the longitudinal distance between the outer or remote edges of the passages 18—19 is less than the distance between the seat-engaging ends of the piston 17. The annular space 20 surrounding the piston chamber leads to an outlet port 21 for connection to the actuating cylinder for the landing gear or brakes, or to some other device to be actuated.

Intermediate its ends, the piston 17 has a cam element 22 engaged by a biasing element 23 in the form of a spring-pressed ball, the spring being shown at 24. The cam 22 is raised at the central part of the piston and tapers toward the ends of the piston.

In operation, the piston 17 is held in the position shown in Fig. 1 as long as the system of normal operating fluid, to which coupling 12a is connected, is at substantially greater pressure than the system of emergency operating fluid to which coupling 13a is connected. Thus, the normal operating fluid may be directed through port 12, cylinder 11, passages 19, space 20 and port 21 to one end of the main actuating cylinder to extend the landing gear. At the same time, the inlet port 13 is tightly sealed by the piston to prevent leakage through this port, the sealing being augmented by the biasing action of ball 23 on cam 22. However, if the pressure at port 12 should decrease inordinately, as by reason of breakage of the normal operating fluid supply line to coupling 12a, then the pressure of the emergency operating fluid in port 13 is sufficient to move the piston to the right against the pressure in port 12 and the biasing action of the ball and cam 23—22. As the piston moves to the right, it first closes passages 19 before it begins to open passages 18. The spring-pressed ball 23 and cam 22 prevent the piston from remaining in a neutral or intermediate position and snap it against the seat 14 forming port 12. The port 12 is thus tightly sealed in the same manner that port 13 was formerly sealed. The emergency operating fluid can now pass from port 13 through cylinder 11, passages 18, space 20 and port 21 to the main actuating cylinder to extend the landing gear. When the normal operating fluid system is restored, the piston 17 is returned in a similar manner to the position shown in Fig. 1, due to the fact that the pressure in port 12 will predominate over the pressure in port 13.

It will be understood that the operation of the selector valve when applied to a dual pedal system for brakes will be similar to the operation previously described. That is, the pressure fluid lines from the two brake pedals will lead to the couplings 12a and 13a, respectively; and the piston 17 will shuttle back and forth as first one pedal and then the other applies the greater or predominating fluid pressure, so that the fluid line having the greater pressure will be connected through chamber 11 to the outlet port 21 leading to the wheel brake, to the exclusion of the other fluid line.

I claim:

1. An automatic source selector valve comprising a valve housing forming a piston chamber, the chamber having opposed inlet ports at its ends adapted for connection to separate fluid pressure sources, piston seats defining said ports, a double-ended piston reciprocatably movable in the chamber and operable to engage said seats and seal said ports alternately in the reciprocation of the piston, the housing having a pair of outlet passages leading laterally from the piston chamber between said seats and spaced longitudinally of the piston, whereby engagement of the piston with either seat allows communication between the other seat and the housing passage nearer thereto via the chamber, each housing passage being spaced from the more remote seat a distance greater than that between the seat engaging parts of the piston, resulting in a simultaneous overlapping of both housing passages by the piston during a portion of its movement between the seats and thus precluding internal leakage between the opposed ports during the piston operation, and interengaging cam and biasing elements located one on the piston and the other in the housing and operable to shift the piston from an intermediate position to either seat depending upon which of the pressures in said ports predominates.

2. A selector valve according to claim 1 in which the cam element is located on the piston and the biasing element is located in the housing.

3. A selector valve according to claim 1, in which the biasing element is a spring-pressed ball engaging the cam element.

4. A selector valve according to claim 1, in which the valve housing has an outlet port and forms an annular space surrounding the piston chamber and through which said passages communicate with the outlet port.

5. A selector valve according to claim 1, in which the piston seats defining the opposed ports are rubber-like rings limiting the reciprocating movements of the piston.

6. A selector valve according to claim 1, in which the housing includes a pair of annular clamping members holding each piston seat, each seat being a rubber-like ring extruded by its clamping members inwardly into the path of the piston, one of the clamping members for each ring forming a metallic seat for the piston.

7. A selector valve according to claim 1 wherein the piston chamber is undercut at either end to form an annular groove, a rubber-like ring disposed respectively in each of said grooves to restrain one face and the outer periphery thereof, a clamping ring for engaging respectively the opposite face of each of the rings, each of the clamping rings having an axially extending lip which lies adjacent the inner periphery of one of the respective rings, the length of the lip being less than the thickness of the corresponding ring so that the resulting bulge of the ring forms one seat for the piston, the end of the lip being positioned to act as a stop for limiting the travel of the piston.

(References on following page)

References Cited in the file of this patent

UNITED STATES PATENTS

| | | |
|---|---|---|
| 870,806 | Turner | Nov. 12, 1907 |
| 2,300,694 | Overbeke | Nov. 3, 1943 |
| 2,311,851 | McClure | Feb. 23, 1943 |
| 2,408,799 | Melichar | Oct. 8, 1946 |
| 2,417,494 | Hoof | Mar. 18, 1947 |
| 2,481,460 | Williams | Sept. 6, 1949 |
| 2,651,491 | Ashton et al. | Sept. 8, 1953 |

FOREIGN PATENTS

| | | |
|---|---|---|
| 349,520 | Great Britain | of 1931 |